(12) United States Patent
Curtis et al.

(10) Patent No.: US 6,892,378 B2
(45) Date of Patent: May 10, 2005

(54) METHOD TO DETECT UNBOUNDED GROWTH OF LINKED LISTS IN A RUNNING APPLICATION

(75) Inventors: James R. Curtis, Placerville, CA (US); Eric Hwang, Saratoga, CA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 564 days.

(21) Appl. No.: 09/953,276

(22) Filed: Sep. 17, 2001

(65) Prior Publication Data

US 2003/0061597 A1 Mar. 27, 2003

(51) Int. Cl.[7] .................................................. G06F 9/44
(52) U.S. Cl. ........................................ 717/127; 717/162
(58) Field of Search ............................... 717/124–131, 717/154–158, 162–165; 714/48

(56) References Cited

U.S. PATENT DOCUMENTS 5,784,699 A * 7/1998 McMahon et al. .......... 711/171
6,206,584 B1 * 3/2001 Hastings ...................... 714/35
6,269,477 B1 * 7/2001 Fitzgerald et al. .......... 717/131
2002/0120640 A1   8/2002 Hills

OTHER PUBLICATIONS

Great Britain Search Report issued in connection with foreign counterpart GB application No. 0220476.6, dated May 2, 2003.

* cited by examiner

*Primary Examiner*—Antony Nguyen-Ba

(57) ABSTRACT

A method for detecting memory leakage of a linked list in a running program, includes saving current size of the linked list as a new maximum size of the linked list when a new element is added to the linked list that causes the current size of the linked list to exceed a former maximum size of the linked list, determining whether a first pre-determined period of time has elapsed from when the liked list was created, and determining whether the new maximum size of the linked list exceeds the former maximum size of the linked list during a second pre-determined period of time.

14 Claims, 5 Drawing Sheets

METHOD TO DETECT UNBOUNDED GROWTH OF LINKED LISTS IN A RUNNING APPLICATION

BACKGROUND OF THE INVENTION

This invention relates generally to troubleshooting program code, and more specifically to methods and apparatus for detecting memory leakage in linked lists contained in a running program.

A common problem in software development is memory leaks. A memory leak occurs when a program or an application reserves a piece of memory within a program heap (generally through malloc( ) or new( ) intrinsic calls, depending on the program language), loses track of the fact that the program has reserved this piece of memory, and never frees up the reserved piece of memory. If the program fails to properly release reserved memory enough times during execution of the program, the programming language will keep growing in memory size and will eventually die as the system runs out of memory to give to the running program. This type of program error is known as a "memory leak."

There are several tools available, e.g., Insure™ (by Parasoft) and Purify™ (by Rational Software), that can be run in conjunction with a program to determine if the program has memory leaks. These tools look for cases where a piece of memory is assigned within a function to a local pointer variable. As this same piece of memory is assigned to other variables, a reference count is maintained and a database is updated with the location in the program's source code where each reference occurs. When a variable that has reference to the piece of memory either gets reassigned or is no longer in scope due to a function return, the reference count of the piece of memory is checked to make sure that some other variable still has reference to that piece of memory.

The programmer must explicitly include code in the program to free the piece of memory (often by calling a free( ) intrinsic) when the program is finished with that piece of memory. Once the piece of memory has been freed, the piece of memory is returned to the program heap for re-use by the program. If, however, there are no longer any variables referencing the piece of memory and the piece of memory has not been explicitly freed, the piece of memory is considered leaked. Tools such as Insure™ and Purify™ will report the leak, thus allowing the programmer to track the leak down and rectify the problem.

However, there is another kind of leak that tools such as Insure™ and Purify™ cannot find. These are leaks that occur in linked lists. Most programs today make use of linked list data structures. A linked list is a data structure that allows new elements to be added and linked to the existing list. Queues and stacks are common uses for linked lists, but databases can also be implemented using several linked lists. A file system might also use linked lists, employing the linked lists in a hierarchical manner. Linked lists contain a head pointer that references the first (or last) element in the linked lists. Linked elements also contain "next" pointers, which reference the next element in the list.

The problem with using tools such as Insure™ and Purify™ to find leaks in linked lists is that these tools cannot not deal with situations where there is still some reference to the memory, as with linked lists. As long as there is a reference to the head pointer, there is a reference to the entire linked list and memory leak tools such as Insure™ and Purify™ will not consider any elements in the list as "leaked". However, if the program's code continues to add elements to the linked list without explicitly removing them after they are no longer needed, the linked list will have a leak.

What is needed is a tool that will detect a memory leak in a linked list even though the leaked piece of memory is still being referenced by some variable in the running program.

BRIEF SUMMARY OF THE INVENTION

The method and system described herein are advantageous in that they overcome the above problems by detecting memory leakage in a linked list even though the linked list is still being referenced by some variable in a running program. Another advantage of the method and system described herein is that the growth of the linked list beyond a maximum, former maximum size is tracked, thus allowing a program developer to accurately determine if the linked list is exhibiting memory leakage.

These and other advantages are achieved in a system for detecting memory leakage of a linked list in a running program that includes a processor, an output device, and a memory. The memory stores program code of the running program and modules that control the processor. One module saves a current size of the linked list during a first pre-determined period of time as a new maximum size of the linked list when a new element is added to the linked list that causes the current size of the linked list to exceed a former maximum size of the linked list. Another module determines whether a first pre-determined period of time has elapsed from when the linked list was created, when the current size of the linked list exceeds the former maximum size of the linked list. Once the first pre-determined period of time has elapsed, the linked list reaches a stable state beyond which it should not grow. An additional module determines whether the new maximum size of the linked list exceeds the former maximum size during a second pre-determined period of time. The second pre-determined period of time preferably extends beyond the end of the first pre-determined period of time. The processor executes the running program and executes the modules for detecting memory leakage of linked lists contained in the running program. The output device displays a report when the new maximum size of the linked list exceeds the former maximum size of the linked list.

These and other advantages are also achieved by a method for detecting memory leakage of a linked list in a running program, which includes saving a current size of the linked list during a first pre-determined period of time as a new maximum size of the linked list when a new element is added to the linked list that causes the current size of the linked list to exceed a former maximum size of the linked list. The method also includes determining whether a first pre-determined period of time has elapsed from when the linked list was created, when the current size of the linked list exceeds the former maximum size of the linked list. Once the first pre-determined period of time has elapsed, the linked list reaches a stable state beyond which it should not grow. The method additionally includes determining whether the new maximum size of the linked list exceeds the former maximum size during a second pre-determined period of time. The second pre-determined period of time preferably extends beyond the end of the first pre-determined period of time.

BRIEF DESCRIPTION OF THE DRAWINGS

The invention will be described, by way of example, in the description of exemplary embodiments, with particular reference to the accompanying drawings, in which like reference numbers refer to like elements and in which.

DETAILED DESCRIPTION OF THE INVENTION

Figure 1:
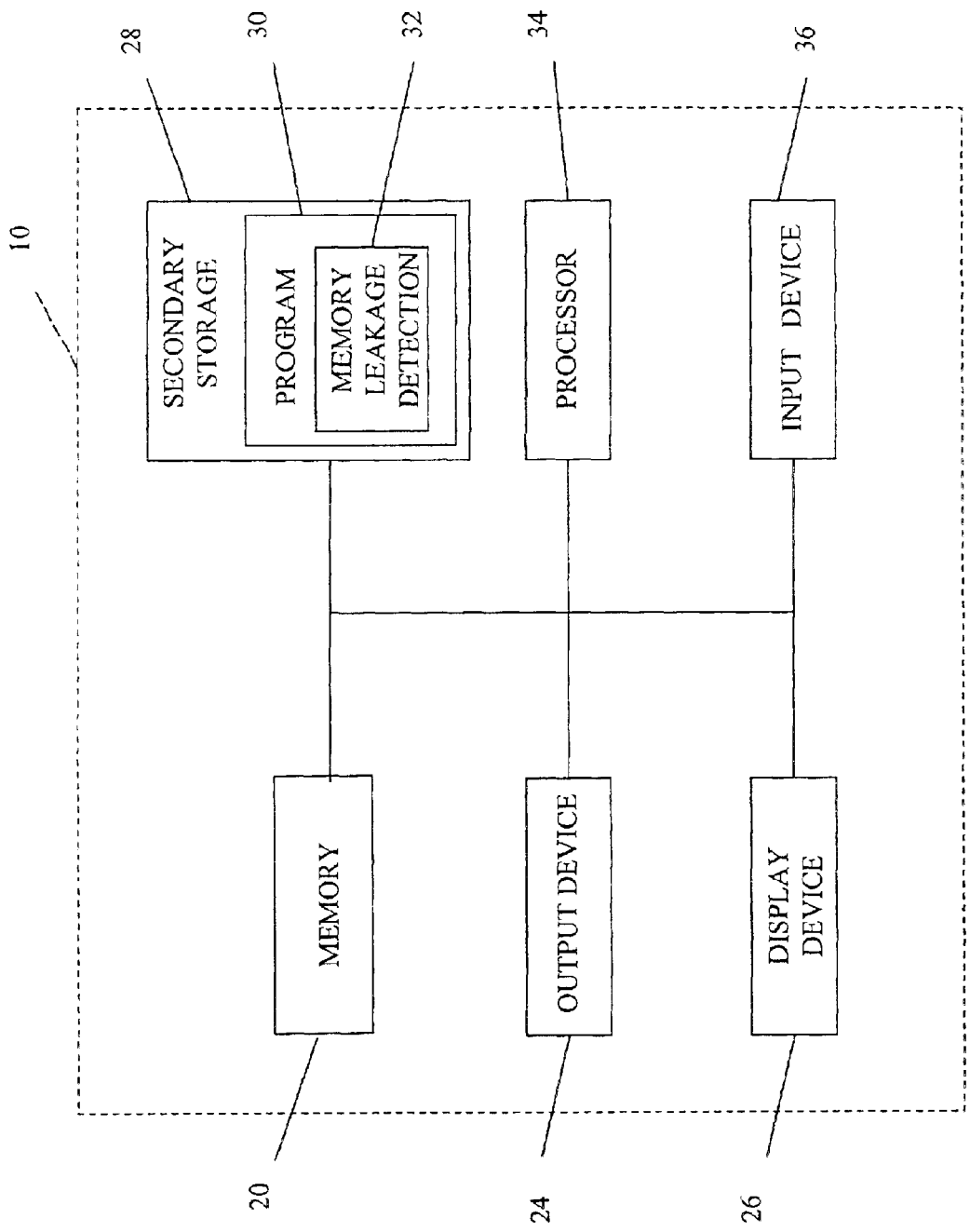
FIG. 1 is a block diagram of a preferred embodiment of a computer system for implementing the present invention.

FIG. 1 is a block diagram illustrating a preferred embodiment of a computer system 10 upon which the method described herein may be implemented. Computer system 10 typically includes a memory 20, an output device 24, a display device 26, a secondary storage device 28, a processor 34, and an input device 36. Memory 20 may include random access memory (RAM) or similar types of memory. Secondary storage device 28 may include a hard disk drive, floppy disk drive, CD-ROM drive, or other types of non-volatile data storage. Secondary storage device 28 may also store one or more program(s) 30, which may be under development, and which preferably incorporate modules containing instructions for memory leakage detection 32, according to the method described herein. Alternatively, the program(s) 30 and the modules for memory leakage detection 32 may be stored in memory 20.

Processor 34 executes a program selected from the program(s) 30 and the modules 32 stored in memory 20 or secondary storage device 50. Input device 36 may include any device for entering information into computer system 10, such as a keyboard, mouse, cursor-control device, touch-screen, infrared, microphone, digital camera, video recorder, or camcorder. Display device 26 may include any type of device for presenting visual information such as, for example, a computer monitor or flat-screen display. Output device 24 may include any type of device for presenting a hard copy of information, such as a printer, and other types of output devices including speakers or any device for providing information in audio form.

Computer system 10 may be any type of user machine for executing the program(s) 30 and the modules for memory leakage detection 32, including personal computers, laptop computers, notebook computers, palm top computers, network computers, or any processor-controlled device capable of executing the program(s) 30 and the modules for memory leakage detection 32.

Figure 2:
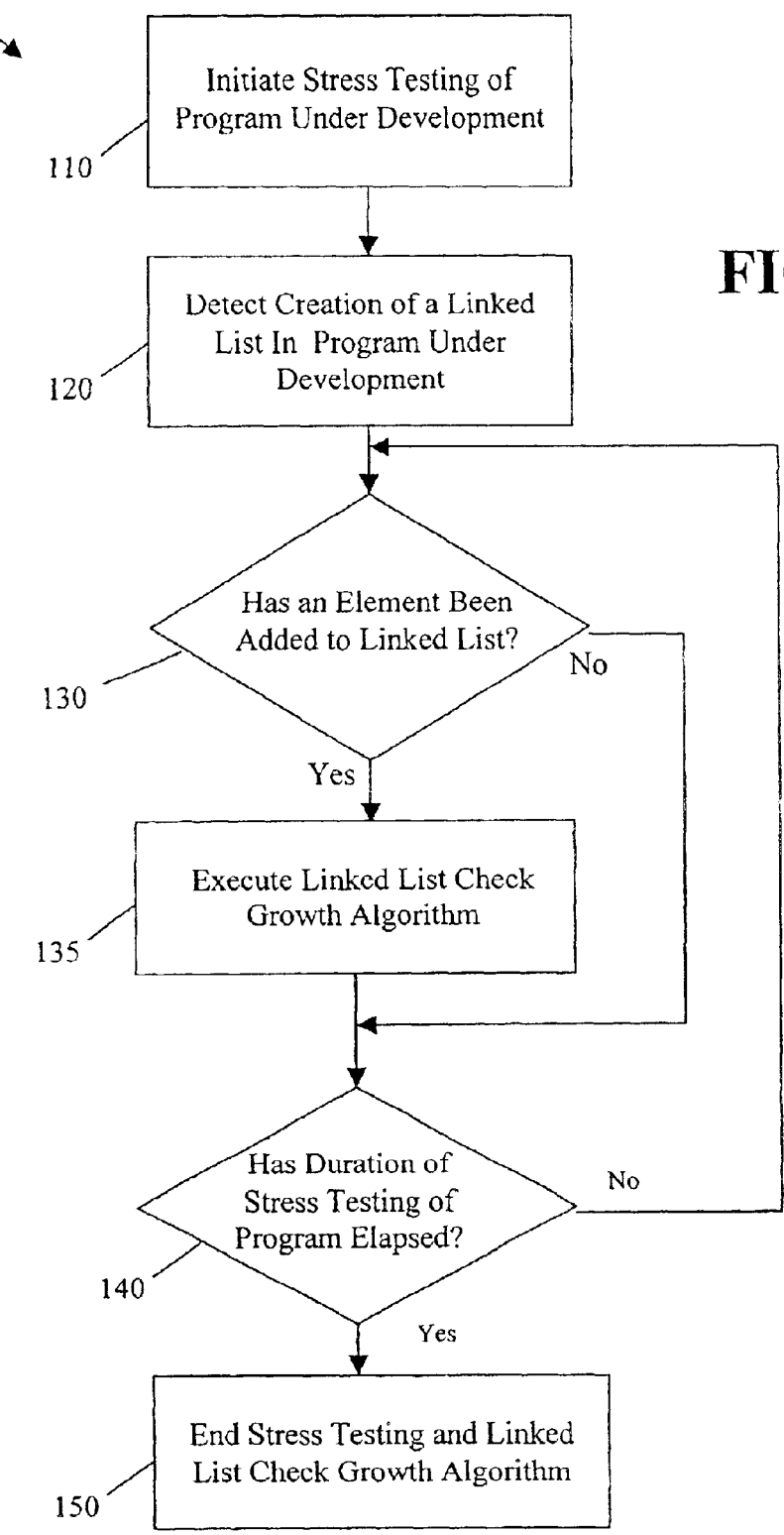
FIG. 2 is a flowchart of a preferred method for detecting memory leakage in linked lists in running programs through stress testing.

FIG. 2 is a flowchart of a preferred method for detecting memory leakage in linked lists in running programs through stress testing, denoted generally by reference numeral 100. Memory leakage detection method 100 includes a step 110 of initiating stress testing of a program 30 under development, a step 120 of detecting creation of a linked list in the program 30 under development, and a step 130 of determining whether an element has been added to the linked list. Method 100 also includes a step 135 of executing a Linked List Check Growth Algorithm 135 when a new element has been added, a step 140 of determining whether a duration of the stress testing of the program 30 has elapsed, and a step 150 of ending the stress testing of the program 30 and ending the Linked List Check Growth Algorithm when the duration of the stress testing has elapsed.

Initiating stress testing at step 110 of the program 30 under development preferably includes performing stressful testing on the program such that long-term real world use of the program 30 can be simulated in a short time period, for example, a few hours. Stress testing involves overwhelming the program 30 with commands. For instance, if the program 30 has some sort of user interface and requires user commands to operate, then stress testing would involve having the program 30 execute a large number of user commands very rapidly for a length of time, e.g., twenty-four hours. By performing this sort of stressful testing, a program developer can simulate, for example, 150 years of user environment execution in a short amount of time.

Code implementing program 30 includes a Linked List Check Growth Algorithm, which is an exemplary piece of code compiled into the program 30 under development that implements the modules for memory leakage detection 32, as seen in FIG. 1. The program code 30 is preferably instrumented with the algorithm to allow the program developer to detect memory leaks. In a preferred embodiment, the program 30 under development includes the algorithm implementation code only while the program 30 is under development. The implementation code for the algorithm is preferably removed from the program 30 once the program 30 is ready for use in a customer environment. Exemplary C code implementing the Linked List Check Growth algorithm is as follows:

```
void cl_list_check_growth(cl_list_t*list)
{
    time_t          current_time;
    unsigned long   since_create_secs;
    unsigned long   since_increase_secs;
    struct tm       cur_tm_buf;
    struct tm       *cur_tm;
    char            fmt_time[CL_LIST_TIME_BUF_SIZE];
    current_time = time(NULL);
    if(list->count> list->high_water_count) {
        list-> high_water_count = list->count;
        /*
         * Determine if the list is to be considered a long-lived list
         * that should have reached stable state. cl_list_11_secs is
         * user-defined and can be set for a value in seconds that
         * will determine when a long-lived list should have
         * reached stable state. For example, set to 7200, then we
         * are saying that we believe our lists should reach stable
         * state within 2 hours after they are created.
         */
        since_create_secs = difftime(current_time, list->create_time);
        if ((list->create_time != current_time) &&
            (since_create_secs >= cl_list_11_secs)) {
            since_increase_secs = difftime(current_time,
                                  list->last_increase_time);
            if (localtime_r(&current_time, &cur_tm_buf) = = -1) {
                memset(&cur_tm_buf, 0, sizeof(struct tm));
            }
            cur_tm = &cur_tm_buf;
            strftime(fmt_time, CL_LIST_TIME_BUF_SIZE, "%b
            %d %H:%M:%S", cur_tm);
            fprintf(stderr, "%s - High water count for Long-lived"
                "list %s increased to %d. This list has been alive"
                "for %u seconds and the time since last increase is"
                "%u seconds.\n",
                fmt_time, list->name, list->high_water_count,
                since_create_secs, since_increase_secs);
            fflush(stderr);
            /*
             * Print a stack trace of where we are so the
             *programmer knows why this list is being increased.
```

```
            */
            dump_process_stack();
            fflush(stderr);
        }
        list->last_increase_time = current_time
    }
}
```

Detecting at step 120 the creation of a linked list preferably includes the Linked List Growth Algorithm noting program language in the running program 30 code that creates a linked list. The specific programming code used to create a linked list in the executing program 30 depends, of course, on the programming language in which the program 30 is written. When a linked list is created, a head pointer for that linked list is also created. The head pointer indicates the location of the beginning of the linked list structure, the "head" of the chain of memory locations identified as belonging to the linked list. In contrast, next pointers point from each linked element in the chain to the next linked element with the next pointer in the last memory link pointing to a NULL value.

The head pointer data structure preferably contains several pieces of information regarding the linked list it is referencing. The head pointer contains a current size field that indicates how many elements are currently in the linked list. Every time an element is added to the linked list, the current size field is incremented and every time an element is released or removed, the current size field is decremented. The head pointer data structure also contains a field indicating a current highwater size or count of the linked list. The highwater count field keeps track of the largest size the linked list has ever gotten to. Whenever the size of the linked list becomes greater than the highwater count, the highwater count is adjusted to match the new largest size.

The head pointer data structure may also contain a name field. When the program 30 initializes a new linked list, the program 30 can specify a name of the linked list as a parameter to the routine that creates the linked list and the name is stored in the head pointer data structure. The name field is a string type of whatever length will allow the linked list to be uniquely identified among all the linked lists that may exist in the running program 30. The name of the linked list is displayed in the message log to help the program developer discover which linked list is suspected of memory leakage.

The last two fields in the head pointer data structure are time-related fields. A create-time field indicates when the linked list was created. When the program 30 initializes the linked list, a system clock (not shown) of computer system 10 is queried and the result is stored in the create-time field. A last-highwater-increase-time field is updated based on a query to the system clock whenever the highwater count of the linked list is increased. The step of detecting at 130 the creation of a linked list is described in further detail below with reference to FIG. 3

Determining, at step 130, whether an element has been added to the linked list preferably includes reading the current size field and checking whether the current size of the linked list has increased. If an element has not been added to the linked list, memory leakage detection method 100 continues monitoring the linked list for added elements until the linked list is either destroyed through appropriate program code or the stressful testing of the program 30 under development has ended. If an element has been added, the Linked List Check Growth algorithm is executed at step 135 to monitor the linked list for possible memory leakage.

Monitoring linked lists for memory leaks using the Linked List Check Growth algorithm includes a process for checking to see whether a certain type of linked list that is created in the program 30 grows beyond a stable size. Such growth is indicative of memory leakage in the linked list(s). The Linked List Check Growth algorithm is triggered every time a new element is added to an existing linked list in the program 30. The program code 30 that added the new element to the linked list will call the Linked List Check Growth algorithm after it has added the new element to the linked list and updated the current size field in the head pointer data structure. Therefore the Linked List Check Growth algorithm operates as a program interrupt, called when a new element is added to an existing linked list and returning to the running program 30 when it has finished executing.

The type of linked lists that may exhibit worrisome memory leakage are long-lived linked lists. Long-lived linked lists are linked lists that exist for the entire life of the running program 30. An example of such a long-lived linked list is a series of linked lists that are used to implement an in-memory database within the program 30. Often the implementation of a database involves a series of tables. These tables are usually implemented via linked lists with the records (or rows) in the table being elements in a linked list. For the purposes of testing, a linked list can be considered long-lived if it still exists after some pre-defined long-lived time limit has elapsed since the linked list was created. The long-lived time limit is a threshold for how long a linked list must exist after it has been created to be considered long-lived. For instance, the program developer might decide that, in a stress test environment, any linked list that still exists two hours or more after it was created is a long-lived linked list.

Long-lived linked lists are in contrast to short-lived linked lists that may only exist for a few seconds or so while the program is being executed. Since short-lived linked lists are very transient, they are not of concern since they are typically not around long enough to exhibit memory leakage that could completely drain the memory reserves of the computer system 10. Long-lived linked lists, on the other hand, eventually reach a stable state or size beyond which they should not be expected to grow since linked elements created are countered by linked elements released. Therefore, if a stable long-lived linked list grows beyond its stable size, it is likely that the linked list is exhibiting memory leakage.

If such growth is detected, a report, which preferably includes the name of the linked list suspected of leaking memory as well as a stack trace of what program code was involved in growing the linked list, can be printed in a message log or by some other reporting means, e.g., a display on a computer monitor, for review by the program developer. The message log, which is created by the Linked List Check Growth algorithm, provides such information as a time when the suspected linked list was created, the duration of how long the suspected linked link has existed, a time when the suspected linked list last increased in size, and a current size of the suspected linked list.

Note that the Linked List Check Growth algorithm is triggered when a linked list, that already exists in program 30, increases in size. Typically, the Linked List Check Growth algorithm monitors multiple linked lists simultaneously. However, for simplicity, the description herein only considers monitoring of a single linked list. A preferred method for executing, at step 135, the Linked List Check Growth algorithm is described below in greater detail with reference to FIG. 4.

The step of determining at 140 whether the duration of the stress testing of the program 30 has elapsed involves querying the system clock to determine whether a predetermined period of time has elapsed from a time when the stress testing began. The duration of the stress test is set by the program developer or whomever else might be conducting the stress testing. The program developer chooses the duration of the stress testing such that he or she is satisfied that all possible memory leaks will be located and that all other program concerns will be dealt with during the stress testing. If the duration of the stress testing has not elapsed, memory leakage detection method 100 continues to monitor any size increases in the linked lists in program 30 (step 130). If the duration of the stress testing has elapsed, the stress testing is ended by halting the execution of the program 30 under test and ending the execution of the Linked List Check Growth Algorithm, step 150.

Once the stress testing of the program 30 under development has concluded and the Linked List Check Growth algorithm has generated reports concerning the possibility of memory leakage in various linked lists, the program developer reviews the message log, which contains the name of the suspected linked list(s) and the related stack trace(s). The program developer examines the message log, looking for instances when a stable linked list continued to grow in size past its stable size. The program developer then looks through the stack trace of code reported in the message log for code that increased the size of the linked list and looks for where the error occurred that caused the memory leakage.

The message log also reports the amount of time that has passed between instances of growth in the linked list. The time between instances of growth is also an indicator of whether there is linked list memory leakage. If the time between instances of growth is on the order of a few minutes, for example, this is a good indication that there is memory leakage. If the time between instances of growth is on the order of seconds then the likelihood that there is memory leakage is greater since such a short time interval is indicative of uncontrolled growth of the linked list. However, if the time between instances of growth is, for instance, five or ten minutes, or longer, this indicates that memory leakage is likely not a problem. Such long intervals between instances of growth are more likely indicative of normal functioning of the program 30. Likewise, memory leakage is less likely if the linked list increases in size only a few times after reaching a stable state, whereas memory leakage is more likely if the stable linked list grows significantly beyond its stable size. Once the program developer has determined that a particular linked list is exhibiting memory leakage, the program developer can edit the program code of the program 30 under development to rectify the error.

Figure 3:
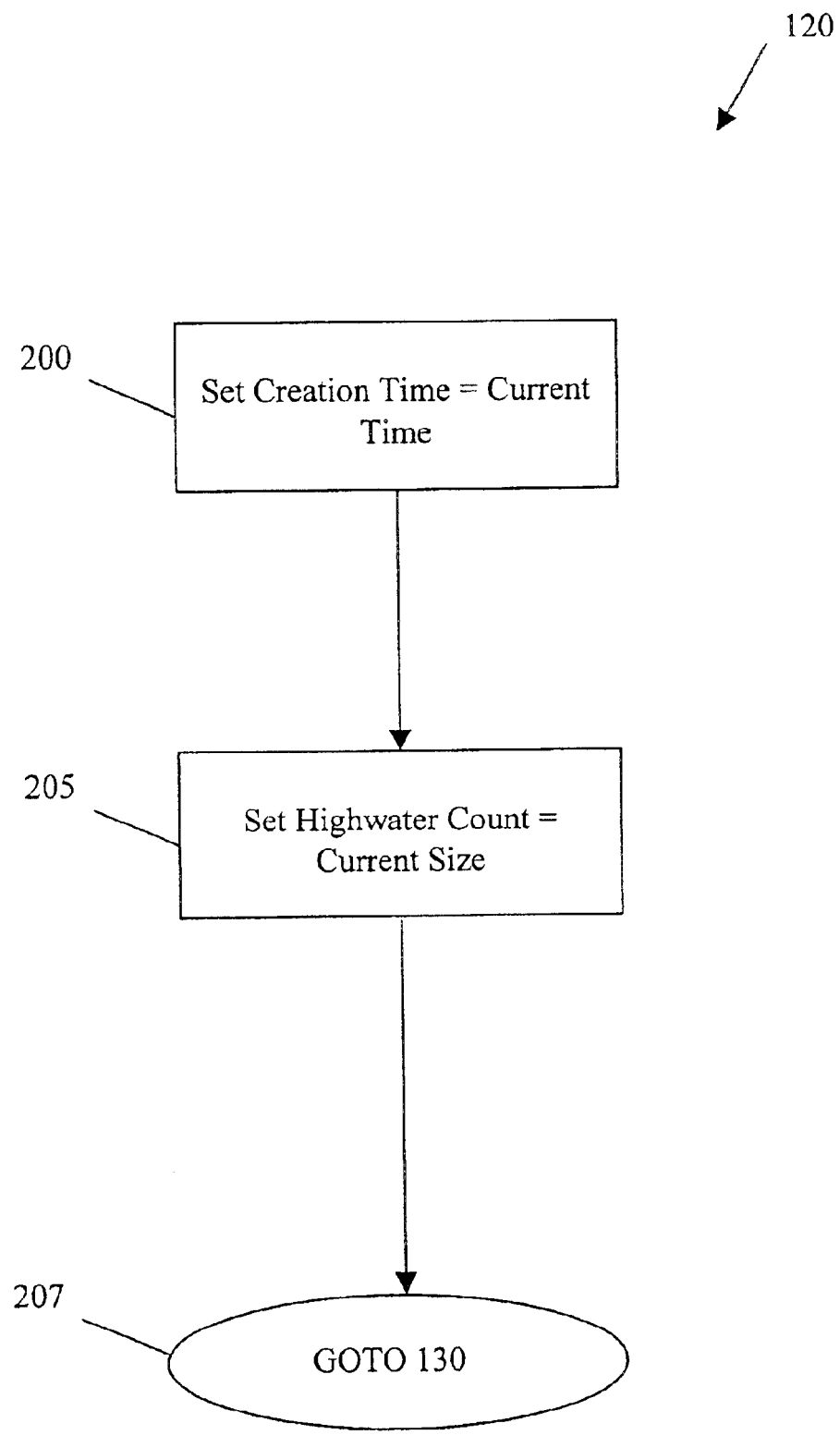
FIG. 3 is a flowchart of a preferred method performed after detecting creation of a linked list in a running programs.

FIG. 3 is a flowchart of a method performed after detecting creation of a linked list in a running program, denoted generally by reference numeral 120. Once program language in the running program 30 code creates a linked list, a time of creation as well as the size of the linked list is saved in the head pointer data structure, which is created when the linked list is created. Detection method 120 includes storing a creation time of the linked list and storing an initial highwater count of the linked list.

Storing, at step 200, the creation time includes reading the system clock in computer system 10 and setting a value in the create-time field of the head pointer data structure equal to the then current time. The creation time of the linked list is the reference point from which it is determined whether or not the linked list has become stable.

Storing, at step 205, the highwater count includes setting a value in the highwater count field of the head pointer data structure equal to the current size of the linked list since the current size of the linked list is as large as the linked list has ever been at that moment in time. Detection method 120 then returns at 207 to memory leakage detection method 100.

Figure 4:
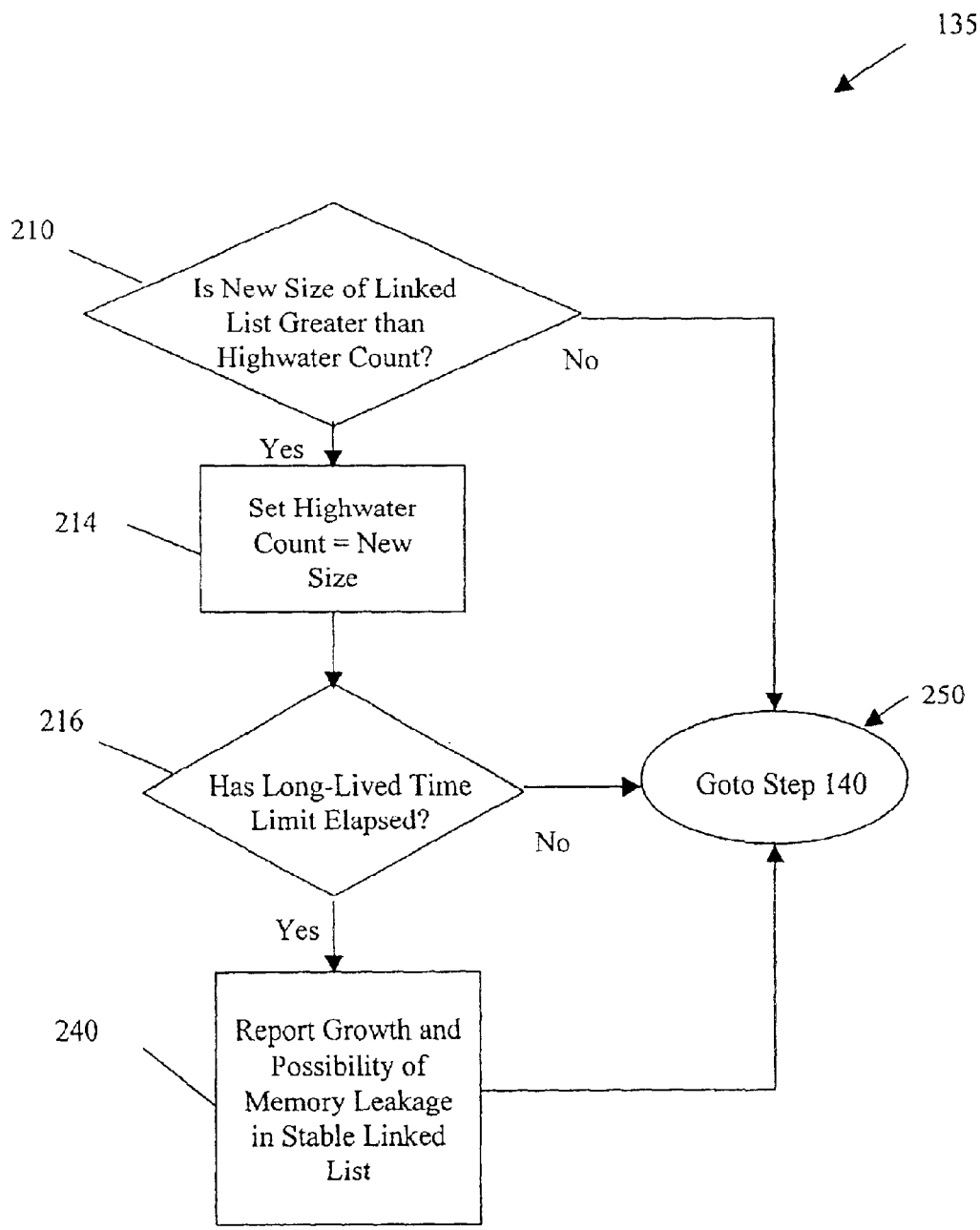
FIG. 4 is a flowchart of a preferred method for checking for linked list memory leaks in running programs.

FIG. 4 is a flowchart of a method for checking for linked list memory leaks in running programs, denoted generally by reference numeral 135, embodied by the Linked List Check Growth algorithm. Check method 135 includes a step 210 of determining whether a new size of the linked list is greater than the highwater count, a step 214 of defining the highwater count as the new size of the linked list, a step 216 of determining whether a long-lived time limit has elapsed, a step 240 of reporting growth of the linked list and a possibility of memory leakage, and a step 250 of returning to memory leakage detection method at 100.

The step 210 of determining whether a new size of the linked list is greater than the highwater count of the linked list includes reading the current size field of the head pointer data structure, which now indicates the new size of the linked list after the linked list has increased in size, and comparing the current size to the highwater count of the linked list. If the new, current size of the linked list is not greater than the current highwater count of the linked list, check method 135 returns, at step 250, to memory leakage detection method 100. If the stress testing has not concluded, memory leakage detection method 100 waits for the linked list to again increase in size (FIG. 2), at which time the comparison between the new size and the current highwater count will be made again. Such a situation would arise when, for instance, the linked list loses several elements since it reached the current highwater count and then gains some elements, thus triggering the Linked List Check Growth algorithm. However, if the number of elements gained by the linked list does not exceed the number of lost elements, then the total number of elements now in the linked list will not reach the current highwater count.

If, however, the new size of the linked list is greater than the highwater count, indicating that the linked list has increased in size beyond the largest the linked list has ever been up to that point, the highwater count is redefined, at step 216, as the new size of the linked list and check method 135 flags the linked list as a possibility for memory leakage. In the context of the previous example, this would occur if the linked list gained more elements than it lost. However, as discussed previously, only long-lived linked lists are of concern. Therefore, check method 135 next determines, at step 216, whether a long-lived time limit has elapsed.

The step 216 of determining whether the long-lived time limit has elapsed includes comparing a current time to the creation time and determining whether the difference of the two times is equal or greater than the long lived time limit. The program developer sets the long-lived time limit, which is a threshold for how long a linked list must exist after its creation to be considered long-lived. For instance, the program developer might decide that any linked list that still exists two hours or more after it was created is a long-lived linked list. Once the creation of a linked list is detected, at step 120 (FIG. 2), the system clock is queried every time the linked list increases in size beyond the then existing highwater count to determine whether the duration of the long-lived time limit has elapsed since the linked list was created. If the long-lived time limit has not elapsed, and check method 135 returns, at step 250, to memory leakage detection method 100. Memory leakage detector method 100 then waits for the linked list to again increase in size if the stress testing has not concluded.

If the long-lived time limit has elapsed, then the linked list is long-lived and, at that point, should be stable. Any growth in the linked list after the long-lived time limit has elapsed is an indication of possible memory leakage. Therefore, since the new size of the linked list is greater than the highwater count, the growth is reported, at step 240, to indicate the possibility that the linked-list under consideration is exhibiting memory leakage. The step 240 of reporting is described below in more detail with reference to FIG. 5. Check method 135 then returns, at step 250, to memory leakage detection method 100, and method 100 then determines at step 140, whether the duration of the stress testing of the program 30 under development has elapsed, as discussed previously. If the duration of the stress testing has not elapsed, memory leakage detection method 100 continues to track any size increases in the linked list until the stress testing of the program 30 has concluded. Linked lists that have reached a former maximum size are continuously monitored for growth beyond their former maximum sizes and newly created linked lists are likewise monitored, as discussed previously, since check method 135 may monitor multiple linked lists simultaneously.

Figure 5:
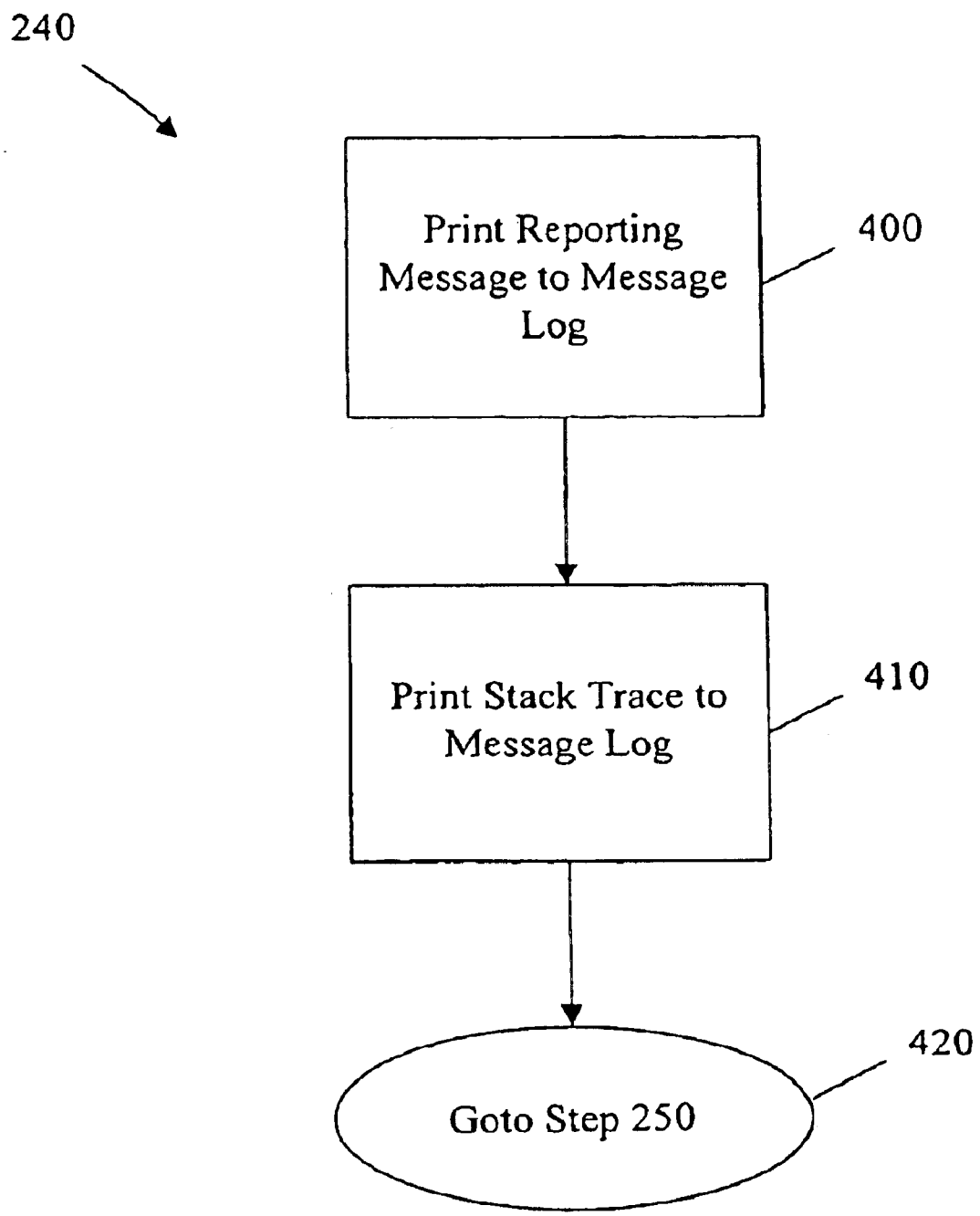
FIG. 5 is a flowchart of a preferred method for reporting possible memory leakage in a stable linked list.

FIG. 5 is a flowchart of a method for reporting possible memory leakage in a stable linked list. Reporting method at step 240, includes printing a reporting message to a message log at step 400, printing a stack trace to the message log at step 410, and then returning to check method 135, at step 420.

Printing, at step 400, the reporting message to the message log includes displaying the reporting message at the computer system 10 through the output device 24 or the display device 26. The message log preferably takes the form of a paper report that the program developer can scan through after the conclusion of the stress testing of the program 30 under development. In an alternative embodiment, the message log can be a text file that the program developer can retrieve and view. The report preferably includes information concerning the name of the suspected linked list, the current highwater count of the suspected linked list, how long the suspected linked list has existed, and when the suspected linked list last increased in size. The program developer uses this information to determine whether there is memory leakage in any of the linked lists that exist in program 30.

Printing, at step 410, the stack trace to the message log likewise includes displaying the stack trace of the programming code that increased the size of the suspected linked list at the computer system 10 through the output device 24 or the display device 26. The program developer can then go through the stack trace and examine the appropriate code to find the programming error that is causing the memory leakage in the suspected linked list. The program developer can then edit the program code of the program 30 to rectify the error.

Having described preferred embodiments of a novel method for detecting memory leakage of linked lists in a running program (which are intended to be illustrative and not limiting), note that modifications and variations can be made by persons skilled in the art in light of the above teachings. Therefore, understand that changes may be made in the particular embodiments disclosed which are within the scope and spirit of what is described as defined by the appended claims.

Having thus described a novel method detecting memory leakage of linked lists with the details and particularity required by the patent laws, what is claimed and desired protected by Letters Patent is set forth in the appended claims.

What is claimed is:

1. A method comprising steps of:
saving a current size of a linked list during a first pre-determined period of time as a new maximum size of the linked list when a new element is added to the linked list, the new element being an element that causes the current size of the linked list to exceed a former maximum size of the linked list;
determining whether the first pre-determined period of time has elapsed when the current size of the linked list exceeds the former maximum size of the linked list; and
determining whether the new maximum size of the linked list exceeds the former maximum size of the linked list during a second pre-determined period of time, wherein the second pre-determined period of time extends beyond the end of the first pre-determined period of time, and wherein the method detects a memory leakage in the linked list when the linked list is still being referenced by a variable in a running program.

2. The method of claim 1, further comprising a step of creating a report when the new maximum size of the linked list exceeds the former maximum size of the linked list during the second pre-determined period of time.

3. The method of claim 2, wherein the report includes one of a name of the linked list, a duration of the linked list, a time since the linked list last increased in size, and a current size of the linked list.

4. The method of claim 2, wherein the report includes a stack trace that displays a program code of a procedure call in a running program that increased the size of the linked list.

5. The method of claim 1, further comprising steps of:
storing a creation time of the linked list when the linked list is created; and
maintaining the current size of the linked list.

6. A computer-readable medium that includes modules for controlling a processor, the modules comprising:
a module to save a current size of a linked list during a first pre-determined period of time as a new maximum size of the linked list when a new element is added to the linked list, the new element being an element that causes the current size of the linked list to exceed a former maximum size of the linked list;
a module to determine whether a first pre-determined period of time has elapsed when the current size of the linked list exceeds the former maximum size of the linked list; and
a module to determine whether a new maximum size of the linked list after the first pre-determined period of time has elapsed exceeds the former maximum size of the linked list during a second pre-determined period of time, wherein the second pre-determined period of time extends beyond the end of the first pre-determined period of time, and wherein the determining modules detect a memory leakage in the linked list when the linked list is still being referenced by a variable in a running program.

7. The computer-readable medium of claim 6, further comprising a module to create a report when the new maximum size of the linked list exceeds the former maximum size of the linked list during the second pre-determined period of time.

8. The computer-readable medium of claim 7, wherein the report includes one of a name of the linked list, a duration of the linked list, a time since the linked list last increased in size, and a current size of the linked list.

9. The computer-readable medium of claim 7, wherein the report includes a stack trace that displays a program code of a procedure call in a running program that increased the size of the linked list.

10. The computer-readable medium of claim 6, further comprising:
- a module to store a creation time of the linked list when the linked list is created; and
- a module to maintain the current size of the linked list.

11. A system comprising a processor, an output device, and memory to store program code of a running program and that includes modules to control the processor, the modules comprising:
- a module to save a current size of a linked list during a first pre-determined period of time as a new maximum size of the linked list whenever a new element is added to the linked list, the new element being an element that causes the current size of the linked list to exceed a former maximum size of the linked list;
- a module to determine whether a first pre-determined period of time has elapsed when the current size of the linked list exceeds the former maximum size of the linked list; and
- a module to determine whether a new maximum size of the linked list exceeds the former maximum size of the linked list during a second pre-determined period of time, wherein the second predetermined period of time extends beyond the end of the first pre-determined period of time,
- wherein the processor executes the running program and executes the modules, detects a memory leakage in the linked list when the linked list is still being referenced by a variable in the running program, and
- wherein the output device displays a report when the current size of the linked list exceeds the former maximum size of the linked list.

12. The system of claim 11, wherein the report includes one of a name of the linked list, a duration of the linked list, a time since the linked list last increased in size, and a current size of the linked list.

13. The system of claim 11, wherein the report includes a stack trace that displays a program code of a procedure call in the running program that increased the size of the linked list.

14. The system of claim 11, further comprising:
- a module to store a creation time of the linked list when the linked list is created; and
- a module to maintain the current size of the linked list.

* * * * *